(12) United States Patent
Drnevich et al.

(10) Patent No.: US 8,057,734 B2
(45) Date of Patent: Nov. 15, 2011

(54) PRODUCING METAL AND CARBON DIOXIDE WITH HYDROGEN RECYCLE

(75) Inventors: Raymond Francis Drnevich, Clarence Center, NY (US); Joseph Michael Schwartz, Williamsville, NY (US); Minish Mahendra Shah, East Amherst, NY (US); Dante Patrick Bonaquist, Grand Island, NY (US)

(73) Assignee: Praxair Technology, Inc., Danbury, CT (US)

(*) Notice: Subject to any disclaimer, the term of this patent is extended or adjusted under 35 U.S.C. 154(b) by 39 days.

(21) Appl. No.: 12/710,570

(22) Filed: Feb. 23, 2010

(65) Prior Publication Data

US 2010/0212457 A1  Aug. 26, 2010

Related U.S. Application Data

(60) Provisional application No. 61/154,864, filed on Feb. 24, 2009.

(51) Int. Cl.
*C21B 7/00* (2006.01)
*C21C 5/40* (2006.01)
(52) U.S. Cl. .......... 266/155; 266/157; 266/197
(58) Field of Classification Search .......... 75/414, 75/458, 468; 423/224, 248, 657; 266/197, 266/155, 157
See application file for complete search history.

(56) References Cited

U.S. PATENT DOCUMENTS

| 3,442,620 | A | * | 5/1969 | Schora, Jr. et al. | 423/658 |
| 3,700,421 | A |   | 10/1972 | Johnson et al. | |
| 3,880,987 | A |   | 4/1975 | Nahas | |
| 3,985,520 | A | * | 10/1976 | Gold | 48/202 |
| 4,078,914 | A |   | 3/1978 | Gold | |
| 4,126,668 | A | * | 11/1978 | Erickson | 423/657 |
| 5,437,706 | A |   | 8/1995 | Edelson | |
| 5,538,706 | A | * | 7/1996 | Kapoor et al. | 423/418.2 |
| 5,582,029 | A |   | 12/1996 | Occhialini et al. | |
| 6,045,602 | A |   | 4/2000 | Shah et al. | |
| 6,667,022 | B2 |  | 12/2003 | Cole | |
| 6,875,411 | B2 |  | 4/2005 | Sanfilippo et al. | |
| 7,404,942 | B2 | * | 7/2008 | Sanfilippo et al. | 423/437.1 |

FOREIGN PATENT DOCUMENTS

| BE | 897123 A1 | 10/1983 |
| EP | 0018235 A1 | 10/1980 |
| GB | 206822 A | 11/1924 |

* cited by examiner

*Primary Examiner* — George Wyszomierski
*Assistant Examiner* — Tima M McGuthry Banks
(74) *Attorney, Agent, or Firm* — Donald T. Black

(57) ABSTRACT

Offgas containing carbon dioxide and carbon monoxide that is produced in the reduction of ores and other metal oxides in a reactor is treated to reduce its carbon dioxide content and is then contacted with metal oxide to reduce the oxidation state of the metal and oxidize carbon monoxide therein to carbon dioxide, following which the reduced metal is oxidized with steam to produce hydrogen that can be fed to the reactor.

38 Claims, 10 Drawing Sheets

PRODUCING METAL AND CARBON DIOXIDE WITH HYDROGEN RECYCLE

CROSS-REFERENCE TO RELATED APPLICATIONS

This application claims priority from U.S. provisional application Ser. No. 61/154,864, filed Feb. 24, 2009.

FIELD OF THE INVENTION

The present invention relates to reducing carbon dioxide emissions from metal-producing facilities such as blast furnaces. It also relates to improving the efficiency of such facilities, such as by reducing the amount of feed material such as coke and coal that is used to produce the metal.

BACKGROUND OF THE INVENTION

In existing blast furnaces, heated air or oxygen-enriched air as well as coal, coke, limestone and iron ore are fed and combined to produce molten, fully reduced metal while also producing blast furnace gas that contains carbon dioxide and carbon monoxide. Often, a portion of the blast furnace gas is combusted to generate heat for heating the incoming air or oxygen-enriched air.

BRIEF SUMMARY OF THE INVENTION

One aspect of the present invention comprises a method for producing metal comprising (A) feeding carbonaceous matter and an oxide of at least one base metal to a reactor and forming therein fully reduced base metal and offgas that comprises carbon monoxide and carbon dioxide;

(B) removing carbon dioxide from at least a portion of said offgas to produce a product stream comprising carbon dioxide, and a carbon dioxide-depleted offgas comprising carbon monoxide; and (C) contacting the carbon dioxide-depleted offgas with a reactor metal oxide in which the reactor metal is at a first oxidation state, to produce reactor metal or a reactor metal oxide in which the oxidation state of the reactor metal has been reduced to a second lower oxidation state by reaction of oxygen from the reactor metal oxide with carbon monoxide in the carbon dioxide-depleted offgas to produce carbon dioxide, and subsequently contacting said reactor metal or reactor metal oxide at said second oxidation state with steam to produce hydrogen and oxidize said reactor metal or reactor metal oxide to said first oxidation state.

Preferably, hydrogen formed in step (C) is fed to the reactor of step (A).

One embodiment of step (C) comprises alternately (i) feeding said carbon dioxide-depleted offgas to a first bed containing reactor metal oxide in which the reactor metal is at a first oxidation state, to reduce reactor metal therein, and feeding steam to a second bed to oxidize reactor metal or reactor metal oxide therein to said first oxidation state, and (ii) feeding said carbon dioxide-depleted offgas to said second bed and feeding steam to said first bed.

Other embodiments of step (C) comprise (i) feeding to a first bed said carbon dioxide-depleted offgas and reactor metal oxide in which the reactor metal is at a first oxidation state, and reducing said reactor metal oxide and producing a carbon dioxide-augmented stream in said first bed, and (ii) feeding reduced reactor metal oxide from said first bed, and steam, to a second bed and in said second bed producing hydrogen and oxidizing said reduced reactor metal oxide to produce reactor metal oxide in which the reactor metal oxide is at said first oxidation state, and feeding said reactor metal oxide produced in said second bed to said first bed.

Another aspect of the present invention is apparatus useful for producing metal comprising (A) a reactor for producing fully reduced base metal and offgas comprising carbon monoxide and carbon dioxide from carbonaceous matter and an oxide of said base metal;

(B) a carbon dioxide removal system, coupled to said reactor to receive at least a portion of said offgas from said reactor, for removing carbon dioxide from said offgas and producing carbon dioxide-depleted offgas; and (C) a hydrogen production system, coupled to said carbon dioxide removal system to receive at least a portion of said carbon dioxide-depleted offgas from said carbon dioxide removal system, for producing hydrogen by contacting carbon dioxide-depleted offgas with a reactor metal oxide in which the reactor metal is at a first oxidation state, to produce reactor metal or a reactor metal oxide in which the oxidation state of the reactor metal has been reduced to a second lower oxidation state by reaction of oxygen from the reactor metal oxide with carbon monoxide in the carbon dioxide-depleted offgas to produce a carbon dioxide-augmented stream, and subsequently contacting said reactor metal or reactor metal oxide at said second oxidation state with steam to produce a hydrogen-containing stream separate from said carbon dioxide-augmented stream and oxidize said reactor metal or metal oxide to said first oxidation state.

Preferably, said reactor is coupled to said hydrogen production system to receive at least a portion of hydrogen produced in said hydrogen production system.

One embodiment of hydrogen production system (C) comprises a first bed and a second bed each coupled to said carbon dioxide removal system and capable of alternately being fed said carbon dioxide-depleted offgas or steam.

Other embodiments of hydrogen production system (C) comprise a first bed coupled to said carbon dioxide removal system to receive said carbon dioxide-depleted offgas, and a second bed coupled to a source of steam, wherein the first and second beds are coupled to each other to feed reduced reactor metal or reduced reactor metal oxide produced in said first bed to said second bed and feed reactor metal oxide produced in said second bed to said first bed.

As used herein, "base metal" means a metal, such as iron, copper, nickel, cobalt, aluminum, zinc, lead, or other metal that may be produced in fully reduced metallic state from an oxide ore using a reducing gas, and includes combinations of such metals.

As used herein, "reactor metal" means a metal that can undergo reactions (1), (2) and (3) described herein, such as iron, copper, nickel, cobalt, lead, zinc, bismuth, manganese, chromium, vanadium, titanium, molybdenum, cerium, or other metals, and includes combinations of such metals.

The metals used as the base metal and as the reactor metal in the practice of this invention can be the same or different.

As used herein, "pressure swing adsorption" means adsorbing a product, in this case carbon dioxide, from a gaseous feed stream onto a solid adsorbent at a first pressure, removing the feed stream depleted of the adsorbed product, and then desorbing the product at a second pressure different from the first pressure. A "pressure swing adsorption system" is a system which adsorbs a product by pressure swing adsorption.

As used herein, "vacuum pressure swing adsorption" (also known as "VPSA") means pressure swing adsorption in which the second pressure is subambient pressure. A "vacuum pressure swing adsorption system" is a system which adsorbs a product by vacuum pressure swing adsorption.

As used herein, "fully reduced base metal" means a composition comprising more than 95% metal which may contain a small amount of oxide of the base metal.

DETAILED DESCRIPTION OF THE INVENTION

Figure 1:
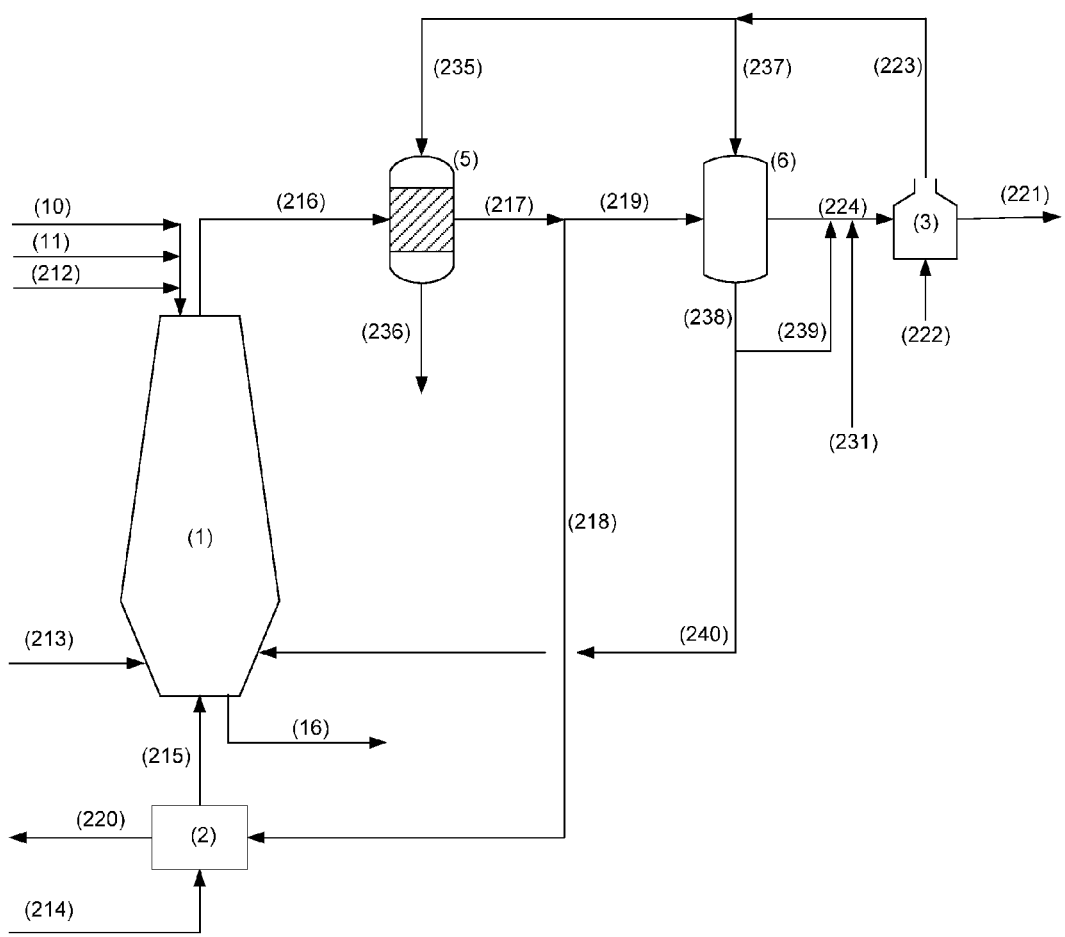
FIG. 1 is a schematic diagram of a preferred embodiment of the present invention.

FIG. 1 shows a preferred embodiment which employs a blast furnace (1) to produce molten iron (16). Air and oxygen are combined to form stream (214) which is fed to stoves (2) for preheating by indirect heat exchange with hot gas generated by combustion of stream (218) in stoves (2). Heated stream (215) from stoves (2) is fed through openings near the bottom of the furnace (1) called tuyeres. Limestone (10), iron ore (11), and coke (212) are fed into blast furnace (1) at the top. Coal (213) is also fed into blast furnace (1) through tuyeres. Oxidation of the coal and coke in the blast furnace and interaction of the iron ore with the reducing gas from oxidation of the coal and coke reduces the iron ore. Heat from oxidation of the coal and coke melts the reduced ore to form molten metallic iron (16) which is recovered from the blast furnace, as is offgas (216), which contains at least carbon monoxide and carbon dioxide. Stream (216) is fed to carbon dioxide removal system (5), which removes $CO_2$ from offgas (216) and produces carbon dioxide product stream (236) and carbon dioxide-depleted offgas (217).

The $CO_2$-depleted offgas (217) is split into streams (218) and (219). Stream (218) is fed to stoves (2) where it is burned to heat air or oxygen-enriched air (214), resulting in flue gas stream (220). Stream (219) is fed to hydrogen production system (6), which produces gaseous hydrogen stream (238) and carbon dioxide-augmented stream (224). Hydrogen (240) is injected into the blast furnace (1). Optionally, stream (240) is heated by indirect heat exchange or by direct means, such as by combusting a portion of the hydrogen contained in stream (240). Stream (224), optionally mixed with excess hydrogen (239) or other fuels (231), such as natural gas or coke oven gas, can be fed to boiler (3) where it is combusted to convert feed water (222) into steam (223). Steam (223) can be used for power production, or fed to the $CO_2$ removal system (5) as stream (235) to strip carbon dioxide, or fed to the hydrogen production system (6) as stream (237).

While the foregoing description of the invention utilizes a blast furnace for ore (base metal oxide) reduction, the present invention can be utilized with systems for reducing ore (base metal oxide) other than blast furnaces, such as "direct reduction" systems that reduce the base metal oxide by reaction with reducing gas, and including the so-called "Corex" and "Midrex" systems that produce reduced metal from metal oxides by reaction with reducing gas produced by high-temperature gasification of coal, or produced by conversion of natural gas (e.g. methane) to hydrogen and carbon monoxide. Any method that reduces ore (base metal oxide) and produces offgas containing CO and $CO_2$ could be used with the present invention. The configuration of the process may need to be modified to adapt it to a specific ore reduction process.

Stream (216) typically contains (on a dry basis) 2-10 vol. % hydrogen, 15-25 vol. % carbon monoxide, 15-25 vol. % carbon dioxide, and the balance nitrogen. Typically stream (216) is at a temperature of 70-150° F. and at a pressure of up to about 30 psig.

Figure 6:
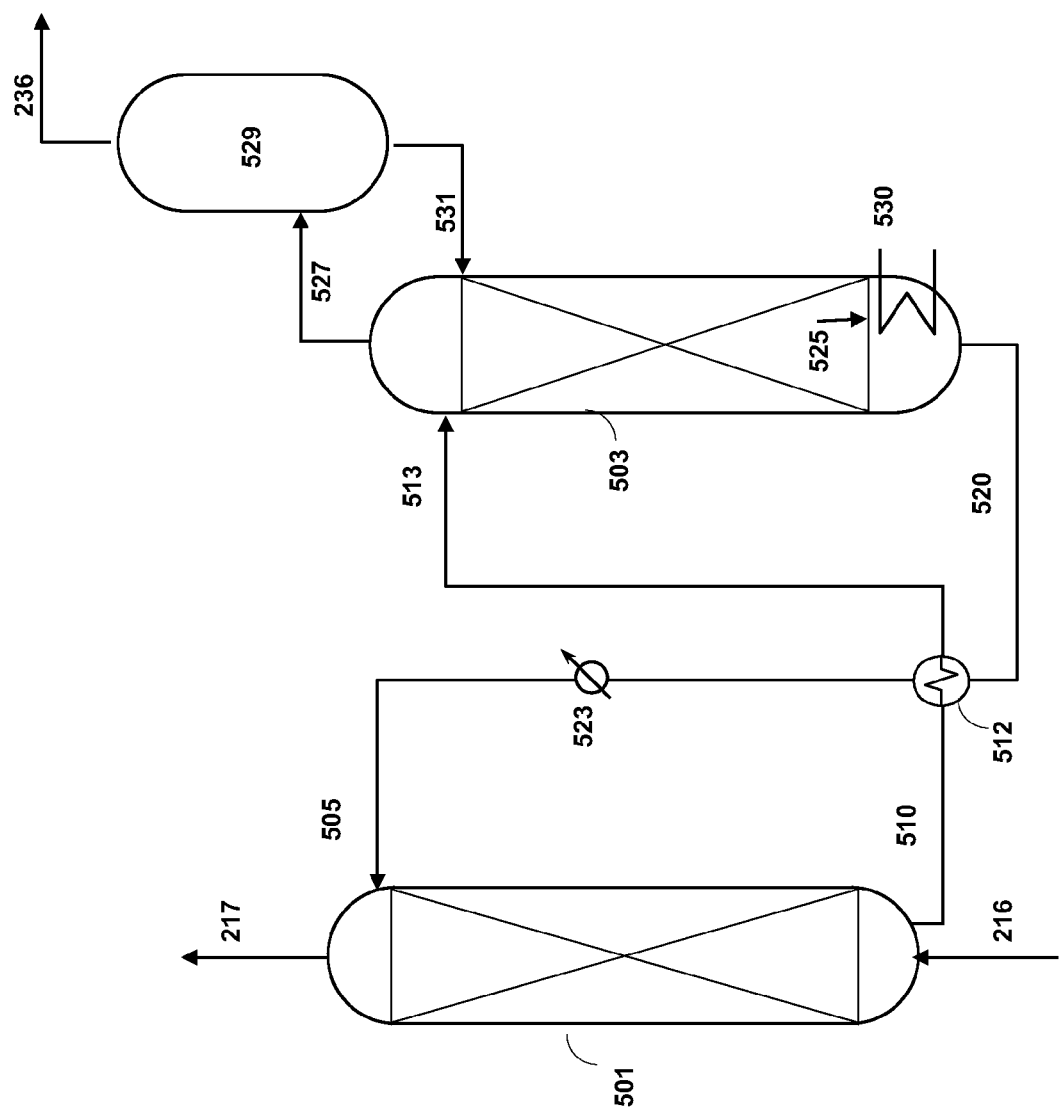
FIG. 6 is a schematic diagram of an embodiment of a carbon dioxide removal system.

A preferred method to remove carbon dioxide from the offgas (216) in system (5) is shown in FIG. 6. After preferably cooling the offgas to 80° F. to 120° F., the cooled offgas (216) is passed into an absorber (501), wherein the offgas is contacted with an aqueous ammonia solution (505) (typically containing 10 to 50 wt. % ammonia), which preferentially absorbs $CO_2$ from the offgas, thereby providing carbon dioxide-depleted gaseous stream (217). The resulting carbon dioxide-rich ammonium carbonate/bicarbonate solution or slurry (510) from the absorber (501) is then pumped and heated (typically to 180° F. to 260° F.) such as in heat exchanger (512) and fed as heated stream (513) to a stripper (503), which may operate at higher pressure than the absorber for $CO_2$ recovery. The stripper bottoms are heated (typically to 240° F. to 300° F.) by heat exchange with hot streams available in the process and/or from unit (3) as shown, and/or heat duty can be provided by reboiler (530). Heating the stripper bottoms generates a stripping stream (steam). A gaseous carbon dioxide-loaded stripping stream (527) is physically separated from the stripped solution. The stripping stream is cooled in condenser (529) to condense water (531) and the resulting gaseous carbon dioxide product stream (236) is separated from the liquid. The stripped absorbent (520) is recycled back to the absorber (501) after heat exchange for cooling such as in heat exchanger (512) and cooler (523).

Alternatively, carbon dioxide can be absorbed from the offgas (216) into other absorbents such as aqueous solutions of organic amine or potassium carbonate, from which product carbon dioxide is then stripped.

Carbon dioxide can also be removed from the offgas (216) using a pressure swing adsorption (PSA) unit or a vacuum pressure swing adsorption (VPSA) unit as system (5). When such an adsorption based $CO_2$ removal unit is used, it may be preferable to compress stream (216) before passing it to system (5). A PSA or VPSA unit comprises multiple beds of adsorbents. For regeneration of adsorbent beds in a PSA unit, a purge gas such as vent nitrogen from an air separation unit or atmospheric air can be used. For regeneration of adsorbent beds in the VPSA unit, a vacuum pump is used to desorb $CO_2$. If a compressor is used, then stream 224 may be expanded to recover power before burning it in boiler (3).

Stream (217) typically contains on a dry basis 2-13 vol. % hydrogen, 20-33 vol. % carbon monoxide, zero to 5 vol. % carbon dioxide, and the balance nitrogen. Stream (217) will typically have a temperature of 80° F. to 120° F. and will typically be at a pressure of up to about 30 psig.

Stream (236) is typically relatively rich in carbon dioxide. Its temperature is typically 120° F. to 220° F. and its pressure typically about 15 psig when using a low-pressure system, although a pressure of over 200 psig is possible when using a high-pressure chilled ammonia system.

The hydrogen production system (6), which is shown as (6) in FIG. 1, produces hydrogen (238) by oxidizing particles of reactor metal or reduced reactor metal oxide with steam (237). The resulting oxidized reactor metal oxide is then reduced by contact with carbon dioxide-depleted offgas (219) produced by $CO_2$ removal system (5).

The general reactions in the hydrogen production system are:

Oxidation of the metal: $H_2O + M_yO_X \rightarrow H_2 + M_yO_{X+1}$ (1)

Reduction of the metal: $H_2 + M_yO_{X+1} \rightarrow H_2O + M_yO_X$ (2)

$CO + M_yO_{X+1} \rightarrow CO_2 + M_yO_X$ (3)

where $MO_X$ represents the reactor metal oxide at a lower oxidation state such as wustite, FeO, which is preferred, or another reduced metal or oxide, and $MO_{X+1}$ represents the reactor metal at a higher oxidation state such as magnetite, $Fe_3O_4$, or another oxidized material, y is a positive integer, typically 1-4, and x is zero or a positive integer, typically 1-5 (depending on the reactor metal). While reactions (1), (2) and (3) describe a system in which the oxidation increases by a valence of one, systems may be employed in which the oxidation state of metal increases and decreases by 2 or more. The lower oxidation state of the reactor metal can be fully reduced metal (x=0 in the above equations). Also, a combination of reactor metal oxides at different oxidation states can be present, as can a combination of oxides of more than one metal. Iron oxide is preferably the reactor metal oxide used in the hydrogen generation reactors because it is readily available in large quantities at steel mills for a low cost. It will be recognized that not necessarily all of the reactor metal present undergoes the indicated increase and decrease of oxidation state.

Iron oxide could also be changed frequently without impacting the overall cost beyond the cost of downtime for a fixed bed reactor system or the cost of a reactor metal oxide removal and loading system in the case of a moving bed reactor system. Another option is to use another metal oxide, preferably one that will undergo reactions (1)-(3) at a lower temperature than iron oxide because operating the process at a lower temperature may reduce heating costs. Another option is to use supported metal particles to maximize reaction rates and surface area, but an engineered material may not perform well enough to justify its additional cost.

Figure 2:
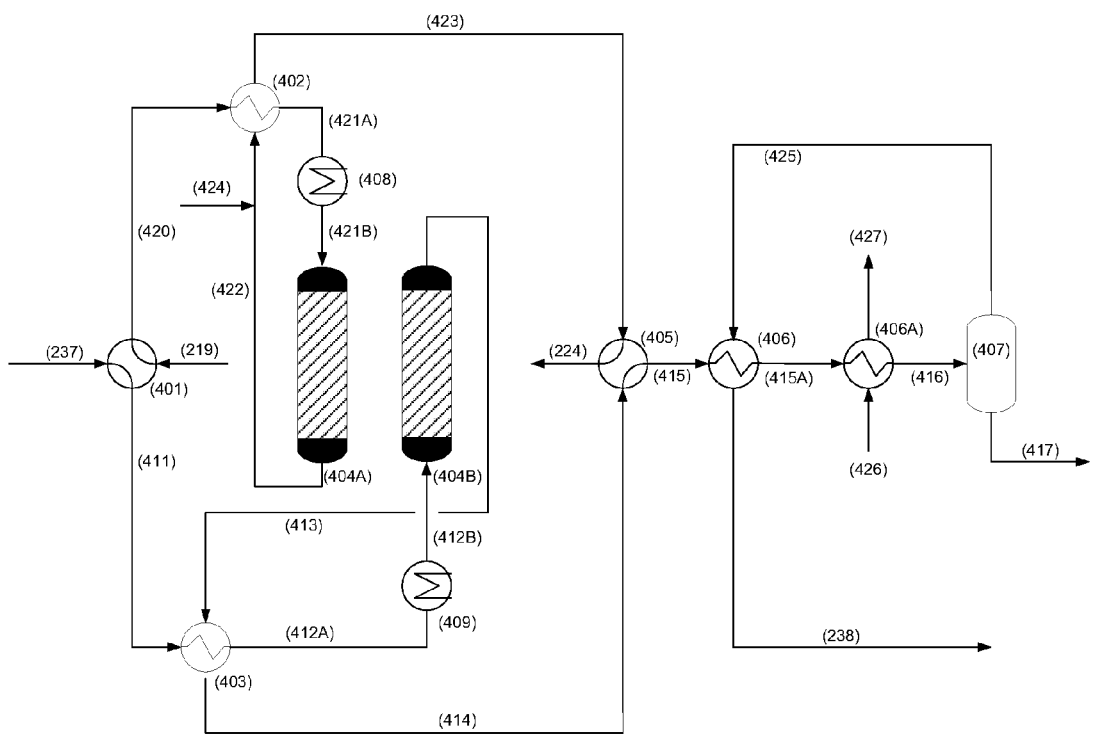
FIG. 2 is a schematic diagram of a preferred hydrogen-generating system useful in the present invention.

FIG. 2 shows details of one embodiment of a hydrogen production system (6). Other configurations are possible, such as using high-temperature switching valves on the hot side of the heat exchangers to reduce dead volume and improve hydrogen purity. The system shown in FIG. 2 uses low-temperature switching valves to reduce capital cost and increase reliability. Steam (237) and $CO_2$-depleted offgas (219) are fed to a switching valve (401). The switching valve (401) directs which stream is sent to which reactor, and periodically switches positions so as to alternate the reactor to which the streams are fed as the beds in the reactors become saturated.

As shown, the steam (411) coming out of the switching valve (401) passes through heat exchangers (403) and (409) where it is heated to about 700° F. to about 1200° F. The resulting superheated steam (412B) is sent to reactor (404B) where it oxidizes reactor metal or reduced reactor metal oxide and forms hydrogen. Stream (413) of hydrogen and any unconverted steam is cooled in heat exchanger (403) (typically to about 300° F. to about 600° F.) and sent as stream (414) to switching valve (405). The exiting mixture (415) is cooled further in heat exchangers (406) and (406A) to condense most of the steam. Heat exchanger (406A) heats cooling water (426) to form heated cooling water (427). The cooled two-phase mixture (416) is sent to phase separator (407), which separates water-vapor-saturated hydrogen product (425) from liquid water (417). Water-saturated hydrogen product (425) is heated in heat exchanger (406) to form heated hydrogen product (238) and prevent condensation of water in a line due to ambient heat loss or other cooling in the line.

As shown, the $CO_2$-depleted offgas (420) coming out of switching valve (401) is heated in heat exchangers (402) and (408), typically to about 800° F. to about 1400° F. Another option is to add air or oxygen (424) to burn some of stream (422) to produce additional heat that could be added to stream (420) in heat exchanger (402). The heated offgas (421B) is sent to reactor (404A) where it reduces reactor metal oxide in the bed to regenerate it for the next hydrogen production step. In reactor (404A), hydrogen and carbon monoxide contained in stream (421B) are oxidized to steam and carbon dioxide, respectively. Hot product gas (422) is cooled in heat exchanger (402) (typically to about 300° F. to about 600° F., depending on the reactor metal used) and the cooled gas (423) is sent through switching valve (405) and may then be used as fuel (224) for the boiler (3), as shown in FIG. 1.

The system (6) employs more than one bed of reactor metal oxide particles to allow for simultaneous reduction in at least one bed and oxidation in the other bed(s). The timing of the alternating of the positions of the switching valves is determined by the oxidation and reduction kinetics of the particular reactor metal(s) and conditions chosen. Heaters (408 and 409) may be necessary where it is not possible to recover all of the heat in the main heat exchangers (402 and 403). The heater is preferably used to heat the $CO_2$-depleted offgas, which is the endothermic reaction side of the reduction-oxidation cycle. Alternatively, oxidizing a small amount of $CO_2$-depleted offgas or other fuel could provide the necessary heat otherwise provided by heaters (408 and 409). It is possible that the steam reaction will produce enough additional heat to compensate for the heat loss in the heat exchanger. Providing as much heat as possible to the endothermic side of the cycle will increase equilibrium conversion and increase reaction rate.

Using this system to produce hydrogen offers the advantage of producing hydrogen at essentially the same pressure as the steam (237) from low-purity, low-pressure reducing gas, such as $CO_2$-depleted offgas (219). The hydrogen production system has the net effect of recovering hydrogen in the reducing gas, producing hydrogen from steam and the CO in the reducing gas, eliminating inerts, such as nitrogen, and compressing the hydrogen product (238).

Stream (238) typically contains more than 95 vol. % hydrogen, as well as water vapor and less than 1 vol. % of carbon monoxide and carbon dioxide. The temperature of stream (238) is typically 150° F. to 500° F. and its pressure is typically up to 300 psig, but preferably about 50 psi higher than the injection pressure at the blast furnace.

Stream (224) typically contains 5-10 vol. % carbon monoxide, 3-10 vol. % hydrogen, and the balance predominantly nitrogen, carbon dioxide, and water vapor. The temperature of stream (224) is typically 80° F. to 200° F. and its pressure is typically up to 30 psig.

The hydrogen in stream (238) produced by the system can be recirculated to the blast furnace (1) as stream (240) without compression and without recycling inerts. The pressure of the hydrogen stream is determined by the pressure of the steam and is independent of the pressure of the feed gas. Hydrogen injection into the blast furnace has several advantages because hydrogen is a very effective reducing agent for iron ore. Hydrogen can be used to replace natural gas in the blast furnace or to reduce coke injection because coke is generally the most expensive reducing agent added to the blast furnace. The reactor system concentrates the reducing capability of the gas. Recycling hydrogen produced from blast furnace offgas improves the overall energy efficiency of the system. The amount of fresh fuel injected into the blast furnace per ton of hot metal is reduced and the amount of energy exported via offgas to be burned is minimized. The pressure of the hydrogen (238) can be increased where desired, merely by increasing the pressure of steam (237), which can be done by operating a boiler at higher pressure using a pump instead of by compressing hydrogen gas, which is likely to cost more.

One process alternative, to increase reactor conversion to hydrogen, is to use a layered bed and operate the hydrogen production system countercurrently. The layers in the bed would be graded by ease of reduction in one direction and ease of oxidation in the other direction. This would allow the conversion of reducing gas to increase to the equilibrium level allowed by the easiest to reduce material and to increase the steam conversion to the equilibrium level allowed by the easiest to oxidize material. It adds additional complexity to packing the bed, and limits the bed life to the life of the material with the shortest life, but the benefits of increased conversion could outweigh the problems.

While the hydrogen production system might produce impure hydrogen during some of the cycle because of mixing that occurs when the valves are switched, the impact on hydrogen purity is not critical in this application. Although additional $CO_2$ is undesirable in the bottom of a blast furnace, a small amount of $N_2$, CO, or $CO_2$ in the hydrogen product at the beginning of the cycle will not harm the blast furnace because the gas in the blast furnace already contains $N_2$, CO, and $CO_2$ and the advantages of adding hydrogen outweigh the disadvantages caused by a small amount of $CO_2$. Even at a few percent total impurity for a short time after switching, these impurities will not have a significant impact on the overall process.

The reactor system described with reference to FIG. 2 is a two-step cycle. Either reducing offgas or steam is fed to a reactor metal oxide bed. Another alternative is a three-step cycle that includes an air or oxygen feed step. This is done to provide heat for the bed and system at the cost of reduced hydrogen production. Depending on how the heat is managed in this system, the three-step system could provide an advantage by eliminating or shrinking heat exchangers 408 and 409. However, the decrease in hydrogen yield and increase in complexity probably mean that the two-step process would be preferred. The air injection step also introduces a possible safety issue if air and reducing gas mix improperly. If a purge step is required, this adds complexity to the process and requires an inert gas stream, which might not be readily available at all locations.

FIGS. 7, 8, 9, and 10 illustrate preferred moving bed reactor configurations for hydrogen production system (6). These embodiments can suffer less coking of reactor metal and reactor metal oxides than the embodiment of FIG. 2. In these embodiments, reactor metal oxides are continuously moving from vessel to vessel.

Figure 7:
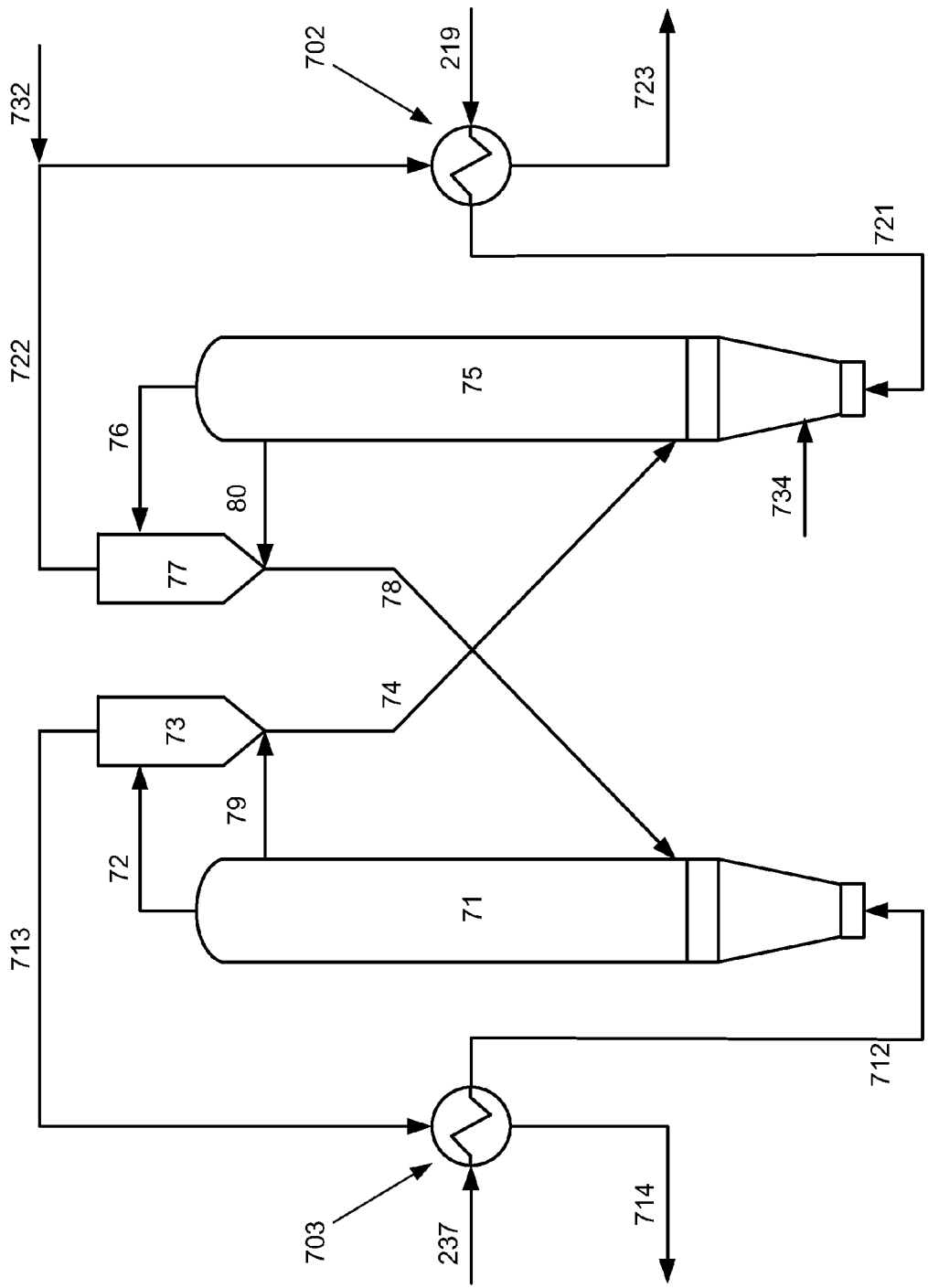
FIG. 7 is a schematic diagram of another hydrogen-generating system useful in the present invention.

The embodiment shown in FIG. 7 employs two columns (71) and (75). Both of these columns are equipped with holes, nozzles, or other openings at their bottom, through which gas can be fed upwards into the column. Both of these columns have openings at their top to permit gas, and solid particulate material entrained in the gas, to leave the column as described below.

As shown in FIG. 7, steam (237) passes through heat exchanger (703) where it is heated to about 700° F. to about 1200° F. The resulting superheated steam (712) can be further heated using an additional heat exchanger (not shown) and is fed into the bottom of column (71) where it oxidizes reactor metal or reduced reactor metal oxide contained in column (71) and forms hydrogen. Stream (78) of solid particulate reactor metal, reduced reactor metal oxide, or a mixture thereof, is fed into the region at or near the bottom of column (71). Stream (72) containing hydrogen, as well as any unreacted steam (and possibly minor amounts less than 1 vol. % each of carbon monoxide and/or carbon dioxide), and also containing entrained solid particles of oxidized reactor metal, leaves the top of column (71) and enters solids separation device (73) such as a cyclone which separates solids from the entering gas. Stream (79) of predominantly solid oxidized reactor metal leaves the top of the reactor and mixes with solids leaving the separation device (73) to form solids stream (74).

Stream (74) of solids, comprising oxidized reactor metal, is fed into the region at or near the bottom of column (75). Stream (713) comprising hydrogen and any unconverted steam is cooled in heat exchanger (703) (typically to about 300° F. to about 600° F.). The resulting cooled stream (714) can be treated further like stream (415) in FIG. 2, that is, it can be cooled in heat exchangers (406) and (406A) to condense most of the steam. Heat exchanger (406A) heats cooling water (426) to form heated cooling water (427). The cooled two-phase mixture (416) is sent to phase separator (407), which separates water-saturated hydrogen product (425) from liquid water (417). Water-saturated hydrogen product (425) is heated in heat exchanger (406) to form heated hydrogen product (238) and prevent condensation of water in a line due to ambient heat loss or other cooling in the line.

Referring again to FIG. 7, $CO_2$-depleted offgas (219) is heated in heat exchanger (702), typically to about 800° F. to about 1400° F. The heated offgas (721) is heated further using an additional heat exchanger (not shown) or by feeding oxygen (734) to the bottom of the column (75), and is fed into the bottom of column (75), where it reduces reactor metal oxide contained in column (75). As seen, reactor metal oxide is fed into column (75) as stream (74). In column (75), hydrogen and carbon monoxide contained in stream (721) are oxidized to steam and carbon dioxide, respectively, and oxidized reactor metal is reduced to an oxide in which the reactor metal is in a reduced oxidation state, to fully reduced metal, or a mixture thereof. Stream (76) containing product gas and entrained solid particles of reduced reactor metal oxide leaves the top of column (75) and is fed to a solids separation device (77) such as a cyclone. Stream (80) of predominantly solid reduced reactor metal oxide leaves the top of the reactor and mixes with solids leaving the separation device (77) to form solids stream (78), comprised mainly of the reduced reactor metal, reduced reactor metal oxide, or a mixture thereof, which is fed to column (71).

Device (77) also produces stream (722) of hot product gas which is cooled in heat exchanger (702) (typically to about 300° F. to about 600° F., depending on the reactor metal used) and the cooled gas (723) may then be used as fuel (224) for the boiler (3), as shown in FIG. 1. Stream (722) can be further heated by adding oxygen (732) to provide additional heat to the $CO_2$-depleted offgas (219) in heat exchanger (702), reducing or eliminating the need for an additional heater for the heated offgas (721).

In columns (71) and (75) the driving force for lifting solids is provided by gas flowing from the bottom to the top of each column, at sufficient velocity to entrain particulate matter and carry it out of the top of the column.

Columns (71) and (75) can operate at different pressures if lock hoppers and/or other pressure containment means, such as valves, are used in lines (74) and (78). Although the pressure containment means adds complexity and capital cost, it could provide an important advantage to the process because it would reduce the need to compress $CO_2$-depleted blast furnace gas or hydrogen product. In this case, high-pressure steam to produce high-pressure hydrogen and low-pressure $CO_2$-depleted blast furnace gas could be used in the same moving bed system. A fixed bed reactor system with switching valves can operate the two columns at different pressures without lock hoppers because the switching valves can accommodate a pressure difference.

If lock hoppers or other pressure containment means are not used, both columns must operate at similar pressure. If both columns operate at low pressure, the hydrogen product will need to be compressed using a booster compressor to inject it to the blast furnace or most likely compressed further to export it to another process or storage facility. If both columns operate at higher pressure, hydrogen compression will not be required, but the $CO_2$-depleted blast furnace gas will need to be compressed. Pressurized $CO_2$-depleted blast furnace gas can be expanded to recover power that will reduce operating cost. However, compression of either stream requires capital and operating cost that can be avoided using lock hoppers or other pressure containment means. The desired column pressures are determined by selecting the process with lower total cost.

Typical velocities are on the order of 0.1 to 10 feet/s. Typical particle sizes are 50 to 500 microns.

In a preferred embodiment, in which the reactor metal is iron, the circulating solid material comprises magnetite ($Fe_3O_4$) and wustite (FeO) in differing amounts. Columns (71) and (75) contain a mixture of FeO and $Fe_3O_4$. Column (75) contains a higher percentage of FeO and a lower percentage of $Fe_3O_4$ than column (71) contains. Preferably, extra $Fe_3O_4$ is circulated to act as a thermal sink for the exothermic oxidation reaction. As the reactors, the cyclones, and the standpipes must be operated at high temperature, heat exchangers are used to raise the feed steam and feed blast furnace gas temperatures. The heat is provided by cooling the streams of hydrogen/steam and depleted blast furnace gas.

Figure 8:
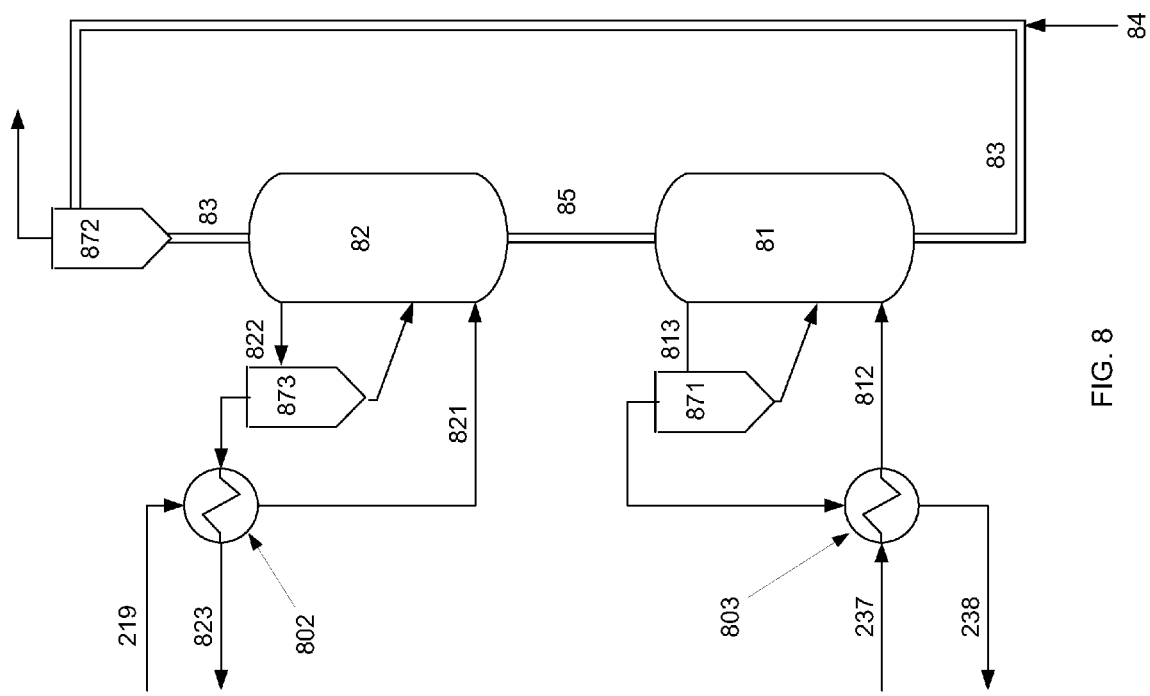
FIG. 8 is a schematic diagram of another hydrogen-generating system useful in the present invention.
Figure 9:
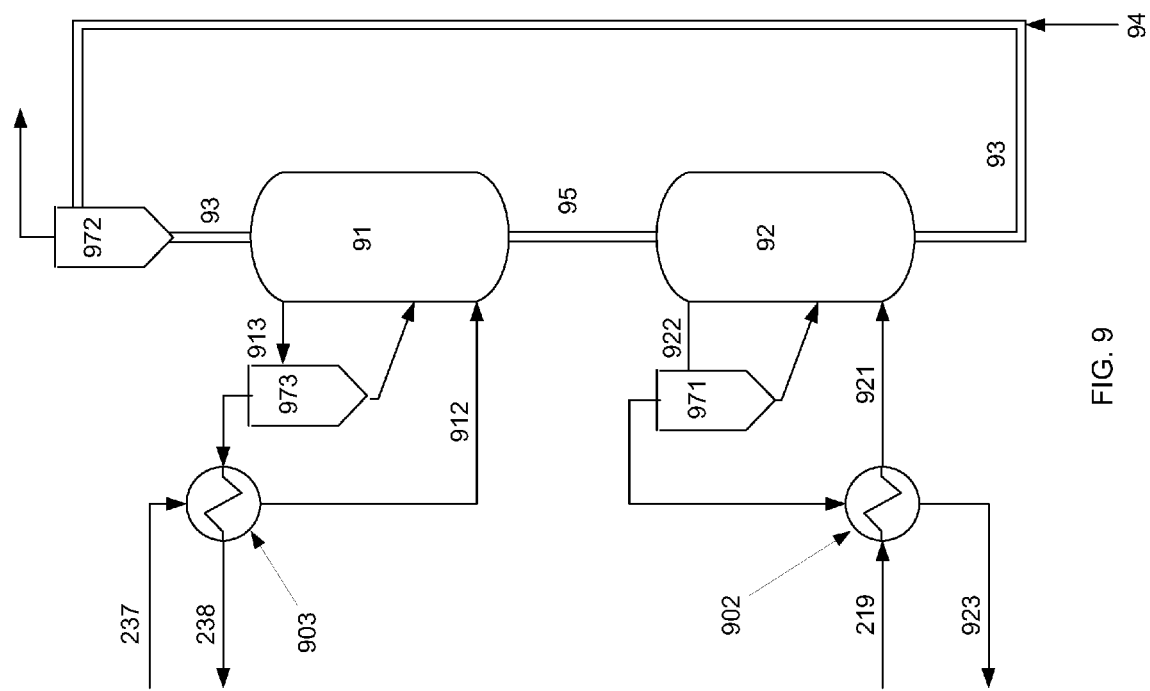
FIG. 9 is a schematic diagram of another hydrogen-generating system useful in the present invention.

FIGS. 8 and 9 illustrate additional embodiments of the hydrogen production system (6), in which the oxidation and reduction reactor vessels are located one on top of the other.

In FIG. 8, steam (237) passes through heat exchanger (803) where it is heated to about 700° F. to about 1200° F. The resulting superheated steam (812) is fed into the bottom of column (81) where it oxidizes reactor metal or reduced reactor metal oxide contained in column (81) and forms hydrogen. Stream (85) of solid particulate reactor metal, reduced reactor metal oxide, or a mixture thereof, is fed into the region at or near the top of column (81). Stream (813) containing hydrogen, as well as any unreacted steam (and possibly minor amounts less than 1 vol. % each of carbon monoxide and/or carbon dioxide), leaves the top of column (81). Preferably stream (813) is passed through a gas-solids separation device (871) such as a cyclone to remove entrained solids from stream (813) and return them to column (81). Stream (813) is cooled in heat exchanger (803) (typically to about 300° F. to about 600° F.). The resulting cooled stream (814) can be treated further like stream (415) in FIG. 2, that is, it can be cooled in heat exchangers (406) and (406A) to condense most of the steam. Heat exchanger (406A) heats boiler feed water (426) to form heated boiler feed water (427). The cooled two-phase mixture (416) is sent to phase separator (407), which separates water-saturated hydrogen product (425) from liquid water (417). Water-saturated hydrogen product (425) is heated in heat exchanger (406) to form heated hydrogen product (238) and prevent condensation of water in a line due to ambient heat loss or other cooling in the line.

Stream (83) of solids, comprising oxidized reactor metal, is fed from the region at or near the bottom of column (81) to the region at or near the top of column (82). Preferably stream (83) is passed through a gas-solids separation device (872) such as a cyclone to remove gas such as transport gas (84) from the solids that are then fed to column (82). In the preferred embodiment in which iron is the reactor metal, this stream would contain FeO and $Fe_3O_4$. In the embodiment of FIG. 8, column (82) is above column (81), so stream (83) needs to be lifted. Lifting can be carried out by use of a high velocity stream (84) of air or steam, or by the use of mechanical lifting apparatus such as a solids pump or an endless belt of scoops or paddles.

Referring again to FIG. 8, $CO_2$-depleted offgas (219) is heated in heat exchanger (802), typically to about 800° F. to about 1400° F. The heated offgas (821) is fed into the bottom of column (82), where it reduces reactor metal oxide contained in column (82). As seen, reactor metal oxide is fed into column (82) as stream (83). In column (82), hydrogen and carbon monoxide contained in stream (821) are oxidized to steam and carbon dioxide, respectively, and oxidized reactor metal is reduced to an oxide in which the reactor metal is in a lower oxidation state, to fully reduced metal, or a mixture thereof. Stream (822) of hot product gas emerges from column (82) and is preferably passed through a gas-solids separation device (873) such as a cyclone to remove entrained solids from stream (822) and return them to column (82). Stream (822) is cooled in heat exchanger (802) (typically to about 300° F. to about 600° F., depending on the reactor metal used) and the cooled gas (823) may then be used as fuel (224) for the boiler (3), as shown in FIG. 1.

Stream (85) containing reduced reactor metal or reduced reactor metal oxide (such as FeO) passes from the bottom of column (82) into column (81).

FIG. 9 is an alternate embodiment of the embodiment shown in FIG. 8, wherein in FIG. 9 the column 91 in which the oxidation occurs is above the column 92 in which the reduction occurs.

In FIG. 9, steam (237) passes through heat exchanger (903) where it is heated to about 700° F. to about 1200° F. The resulting superheated steam (912) is fed into the bottom of column (91) where it oxidizes reactor metal or reduced reactor metal oxide contained in column (91) and forms hydrogen. Stream (93) containing solid particulate reactor metal, reduced reactor metal oxide, or a mixture thereof, is fed into the region at or near the top of column (91). Stream (913) containing hydrogen, as well as any unreacted steam (and possibly minor amounts less than 1 vol. % each of carbon monoxide and/or carbon dioxide), leaves the top of column (91). Preferably stream (913) is passed through a gas-solids separation device (971) such as a cyclone to remove entrained solids from stream (913) and return them to column (91). Stream (913) is cooled in heat exchanger (903) (typically to about 300° F. to about 600° F.). The resulting cooled stream (914) can be treated further like stream (415) in FIG. 2, in the same way described above with respect to stream (814). That is, it can be cooled in heat exchangers (406) and (406A) to condense most of the steam. Heat exchanger (406A) heats boiler feed water (426) to form heated boiler feed water (427). The cooled two-phase mixture (416) is sent to phase separator (407), which separates water-saturated hydrogen product (425) from liquid water (417). Water-saturated hydrogen product (425) is heated in heat exchanger (406) to form heated hydrogen product (238) and prevent condensation of water in a line due to ambient heat loss or other cooling in the line.

Stream (93) of solids, comprising reactor metal oxide at a lower oxidation state, fully reduced reactor metal, or a mixture thereof, is fed from the region at or near the bottom of column (92) to the region at or near the top of column (91). Preferably stream (93) is passed through a gas-solids separation device (972) such as a cyclone to remove gas such as transport gas (94) from the solids that are then fed to column (92). In the preferred embodiment in which iron is the reactor metal, this stream would contain predominantly FeO. In the embodiment of FIG. 9, column (91) is above column (92), so stream (93) needs to be lifted. Lifting can be carried out by use of a high velocity stream (94) of air or steam, or by the use of mechanical lifting apparatus such as a solids pump or an endless belt of scoops or paddles.

Referring again to FIG. 9, $CO_2$-depleted offgas (219) is heated in heat exchanger (902), typically to about 800° F. to about 1400° F. The heated offgas (921) is fed into the bottom of column (92), where it reduces reactor metal oxide contained in column (92). Reactor metal oxide to be reduced in column (92) (such as a mixture of FeO and $Fe_3O_4$) is fed into column (92) as stream (95) from the bottom region of column (91). In column (92), hydrogen and carbon monoxide contained in stream (921) are oxidized to steam and carbon dioxide, respectively, and oxidized reactor metal is reduced to an oxide in which the reactor metal is in a lower oxidation state, to fully reduced metal, or a mixture thereof. Stream (922) of hot product gas emerges from column (92) and is preferably passed through a gas-solids separation device (973) such as a cyclone to remove entrained solids from stream (922) and return them to column (92). Stream (922) is cooled in heat exchanger (902) (typically to about 300° F. to about 600° F., depending on the reactor metal used) and the cooled gas (923) may then be used as fuel (224) for the boiler (3), as shown in FIG. 1.

Figure 10:
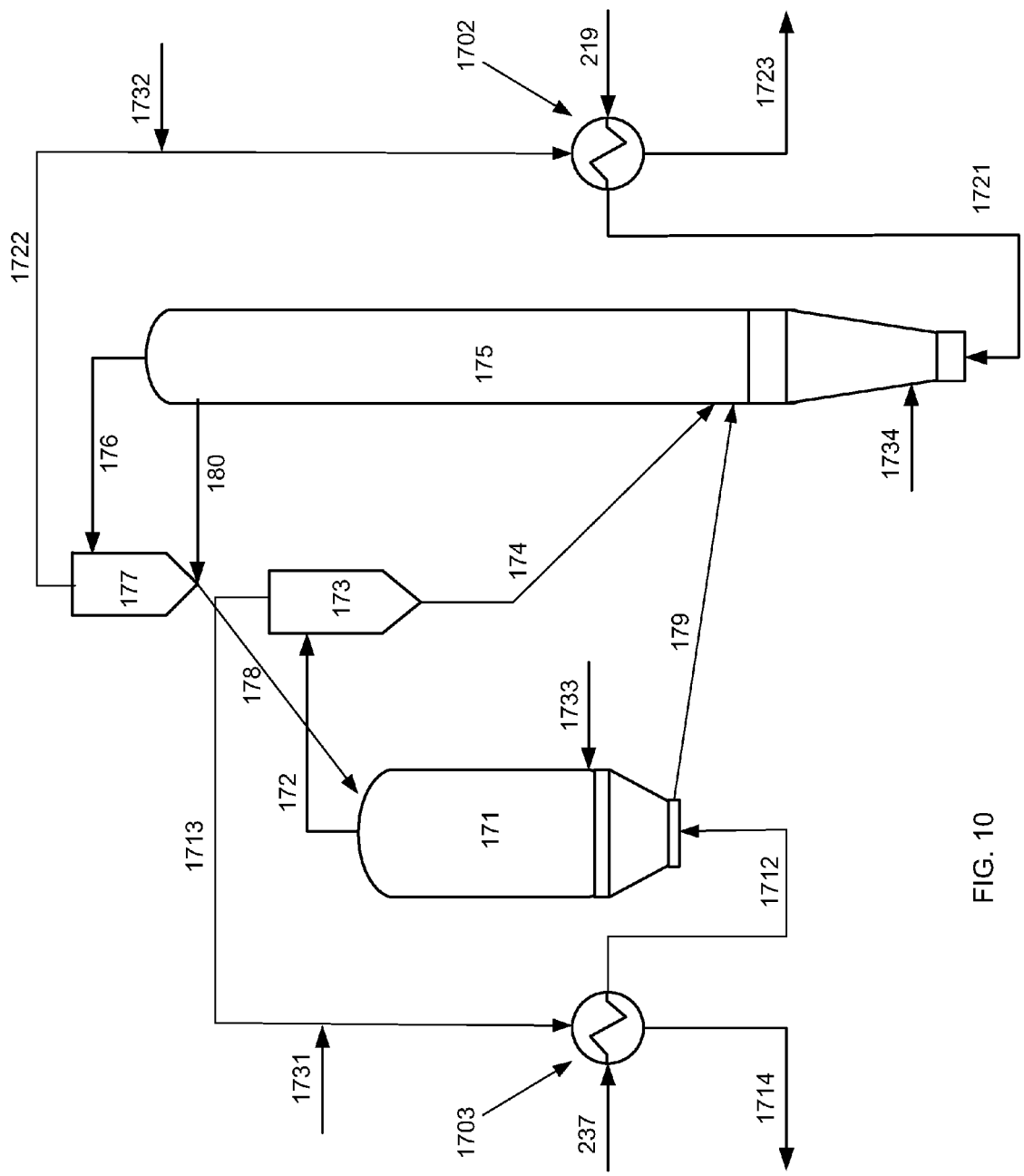
FIG. 10 is a schematic diagram of another hydrogen-generating system useful in the present invention.

The embodiment shown in FIG. 10 employs two columns (171) and (175). Both of these columns are equipped with holes, nozzles, or other openings at their bottom, through which gas can be fed upwards into the column. Both of these columns have openings at their top to permit gas, and solid particulate material entrained in the gas, to leave the column as described below. Column 171 has an opening at the bottom to allow solid particulate material to leave the column.

As shown in FIG. 10, steam (237) passes through heat exchanger (1703) where it is heated to about 700° F. to about 1200° F. The resulting superheated steam (1712) can be further heated using an additional heat exchanger (not shown) and is fed into the bottom of column (171) where it oxidizes reactor metal or reduced reactor metal oxide contained in column (171) and forms hydrogen. Stream (178) of solid particulate reactor metal, reduced reactor metal oxide, or a mixture thereof, is fed into the region at or near the top of column (171). Stream (172) containing hydrogen, as well as any unreacted steam (and possibly minor amounts less than 1 vol. % each of carbon monoxide and/or carbon dioxide), and also containing entrained solid particles of oxidized reactor metal, leaves the top of column (171) and enters solids separation device (173) such as a cyclone which separates solids from the entering gas. Stream (179) of predominantly solid oxidized reactor metal leaves the bottom of the reactor and is fed to the bottom of column (175).

Stream (174) of solids leaving the solids separation device (173), comprising oxidized reactor metal, is fed into the region at or near the bottom of column (175). Stream (1713) comprising hydrogen and any unconverted steam is cooled in heat exchanger (1703) (typically to about 300° F. to about 600° F.). The resulting cooled stream (1714) can be treated further like stream (415) in FIG. 2, that is, it can be cooled in heat exchangers (406) and (406A) to condense most of the steam. Heat exchanger (406A) heats cooling water (426) to form heated cooling water (427). The cooled two-phase mixture (416) is sent to phase separator (407), which separates water-saturated hydrogen product (425) from liquid water (417). Water-saturated hydrogen product (425) is heated in heat exchanger (406) to form heated hydrogen product (238) and prevent condensation of water in a line due to ambient heat loss or other cooling in the line.

Referring again to FIG. 10, $CO_2$-depleted offgas (219) is heated in heat exchanger (1702), typically to about 800° F. to about 1400° F. The heated offgas (1721) is heated further using an additional heat exchanger (not shown) or by feeding oxygen (1734) to the bottom of the column (175), and is fed into the bottom of column (175), where it reduces reactor metal oxide contained in column (175). In the case where the reactors are switched so that the $CO_2$-depleted offgas is fed to column (171), oxygen (1733) can be added to column (171). As seen, reactor metal oxide is fed into column (175) as stream (174). In column (175), hydrogen and carbon monoxide contained in stream (1721) are oxidized to steam and carbon dioxide, respectively, and oxidized reactor metal is reduced to an oxide in which the reactor metal is in a reduced oxidation state, to fully reduced metal, or a mixture thereof. Stream (176) containing product gas and entrained solid particles of reduced reactor metal oxide leaves the top of column (175) and is fed to a solids separation device (177) such as a cyclone. Stream (180) of predominantly solid reduced reactor metal oxide leaves the top of the reactor and mixes with solids leaving the separation device (177) to form solids stream (178), comprised mainly of the reduced reactor metal, reduced reactor metal oxide, or a mixture thereof, which is fed to column (71).

Device (177) also produces stream (1722) of hot product gas which is cooled in heat exchanger (1702) (typically to about 300° F. to about 600° F., depending on the reactor metal used) and the cooled gas (1723) may then be used as fuel (224) for the boiler (3), as shown in FIG. 1. Stream (1722) can be further heated by adding oxygen (1732) to provide additional heat to the $CO_2$-depleted offgas (219) in heat exchanger (1702), reducing or eliminating the need for an additional heater for the heated offgas (1721). Likewise, in the case where the reactors are switched so that the $CO_2$-depleted offgas is fed to column (171), oxygen (1731) can be added to stream (1713) to provide additional heat to heat exchanger (1703).

In column (175) the driving force for lifting solids is provided by gas flowing from the bottom to the top of the column, at sufficient velocity to entrain particulate matter and carry it out of the top of the column.

Columns (171) and (175) can operate at different pressures if lock hoppers and/or other pressure containment means, such as valves, are used in lines (174), (178), and (179). Although the pressure containment means adds complexity and capital cost, it could provide an important advantage to the process because it would reduce the need to compress $CO_2$-depleted blast furnace gas or hydrogen product. In this case, high-pressure steam to produce high-pressure hydrogen and low-pressure $CO_2$-depleted blast furnace gas could be used in the same moving bed system. A fixed bed reactor system with switching valves can operate the two columns at different pressures without lock hoppers because the switching valves can accommodate a pressure difference.

Typical velocities are on the order of 0.1 to 10 feet/s. Typical particle sizes are 50 to 500 microns.

In a preferred embodiment, in which the reactor metal is iron, the circulating solid material comprises magnetite ($Fe_3O_4$) and wustite (FeO) in differing amounts. Columns (171) and (175) contain a mixture of FeO and $Fe_3O_4$. Column (175) contains a higher percentage of FeO and a lower percentage of $Fe_3O_4$ than column (171) contains. Preferably, extra $Fe_3O_4$ is circulated to act as a thermal sink for the exothermic oxidation reaction. As the reactors, the cyclones, and the standpipes must be operated at high temperature, heat exchangers are used to raise the feed steam and feed blast furnace gas temperatures. The heat is provided by cooling the streams of hydrogen/steam and depleted blast furnace gas.

The embodiments of FIGS. 7, 8, 9, and 10 provide advantages. These embodiments can employ smaller particles of the reactor metal and reactor metal oxides, which enhances heat transfer, mass transfer, and gas-solid contact, and enables operation with a higher carbon dioxide content in the stream of reducing gas which would inhibit coking on the reactor metal and its oxides. These embodiments also present a lessened tendency to undergo sintering and channeling compared to a fixed bed of material. The need for special high-temperature switching valves is avoided. Greater operational control and flexibility is provided, in that residence times in the columns can be adjusted and material can be added during operation to make up for any losses.

Figure 3:
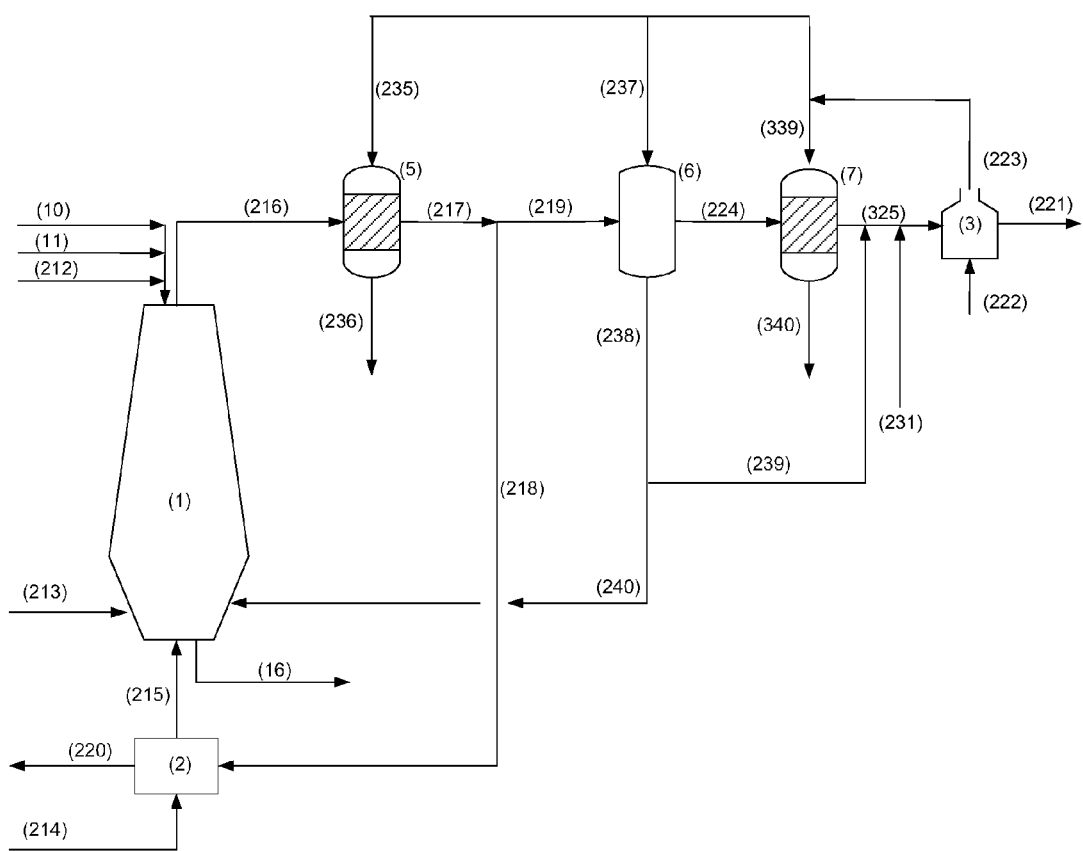
FIG. 3 is a schematic diagram of another embodiment of the present invention.

If the process shown in FIG. 1 does not remove enough $CO_2$, the process shown in FIG. 3 can be used. This process adds a second $CO_2$ removal unit (7) to the system of FIG. 1. This removes additional $CO_2$ (340) from the hydrogen generator offgas (224) for possible capture and sequestration, increasing the heating value of the resulting second carbon dioxide-depleted stream (325), making it easier to burn and reducing the supplemental fuel (231) required. Additional steam (339) must be produced to regenerate the second $CO_2$ removal system and the second system also increases capital cost.

Figure 4:
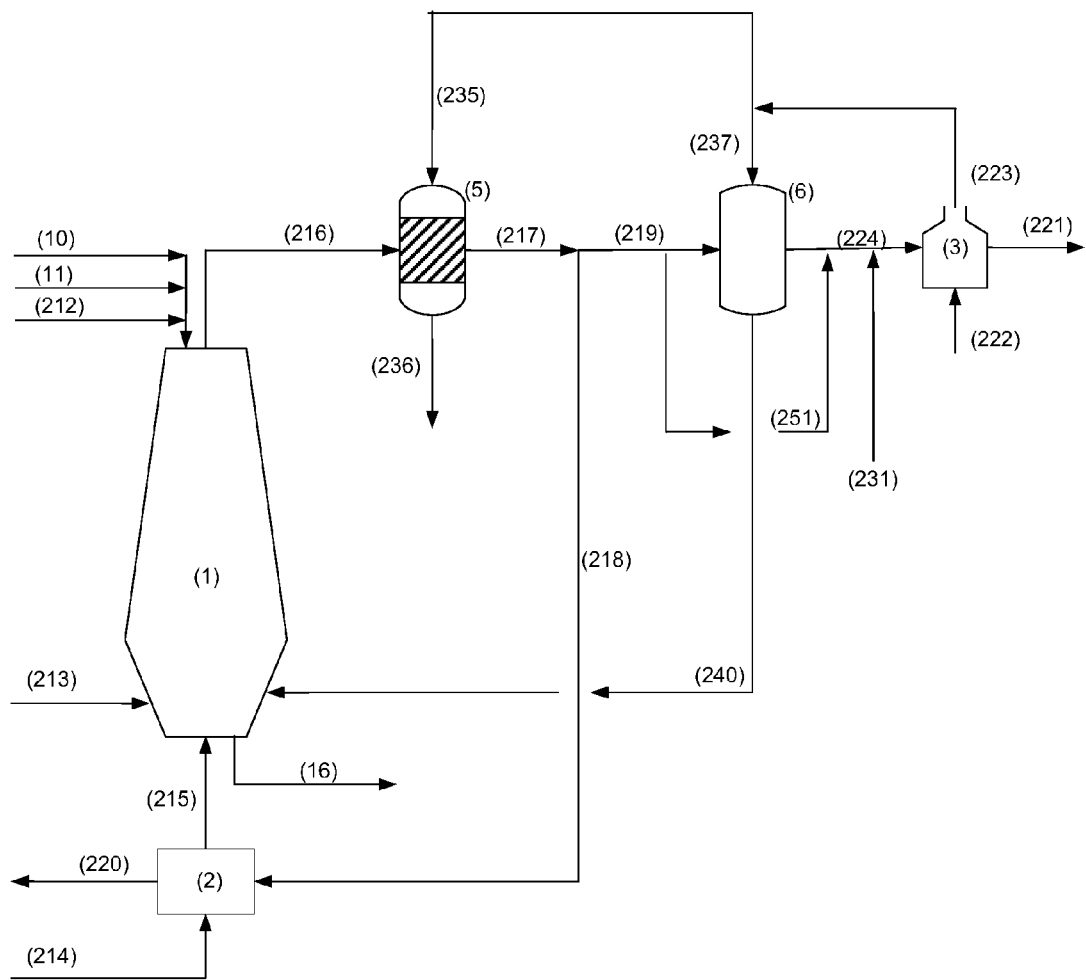
FIG. 4 is a schematic diagram of another embodiment of the present invention.

If the maximum amount of hydrogen that can be produced cannot be used in the blast furnace (1), it can be fed to another blast furnace or the process shown in FIG. 4 can be used. In this case, a portion of stream (219) is drawn off as bypass stream (251) which bypasses the hydrogen production system (6), so less reduction occurs and less steam (237) is required to produce less hydrogen (240) so that no hydrogen product is fed to the boiler (3). In this case, the net effect on the process compared to FIG. 1 is negligible, but the hydrogen generation system (6) is smaller and the capital cost is reduced.

Figure 5:
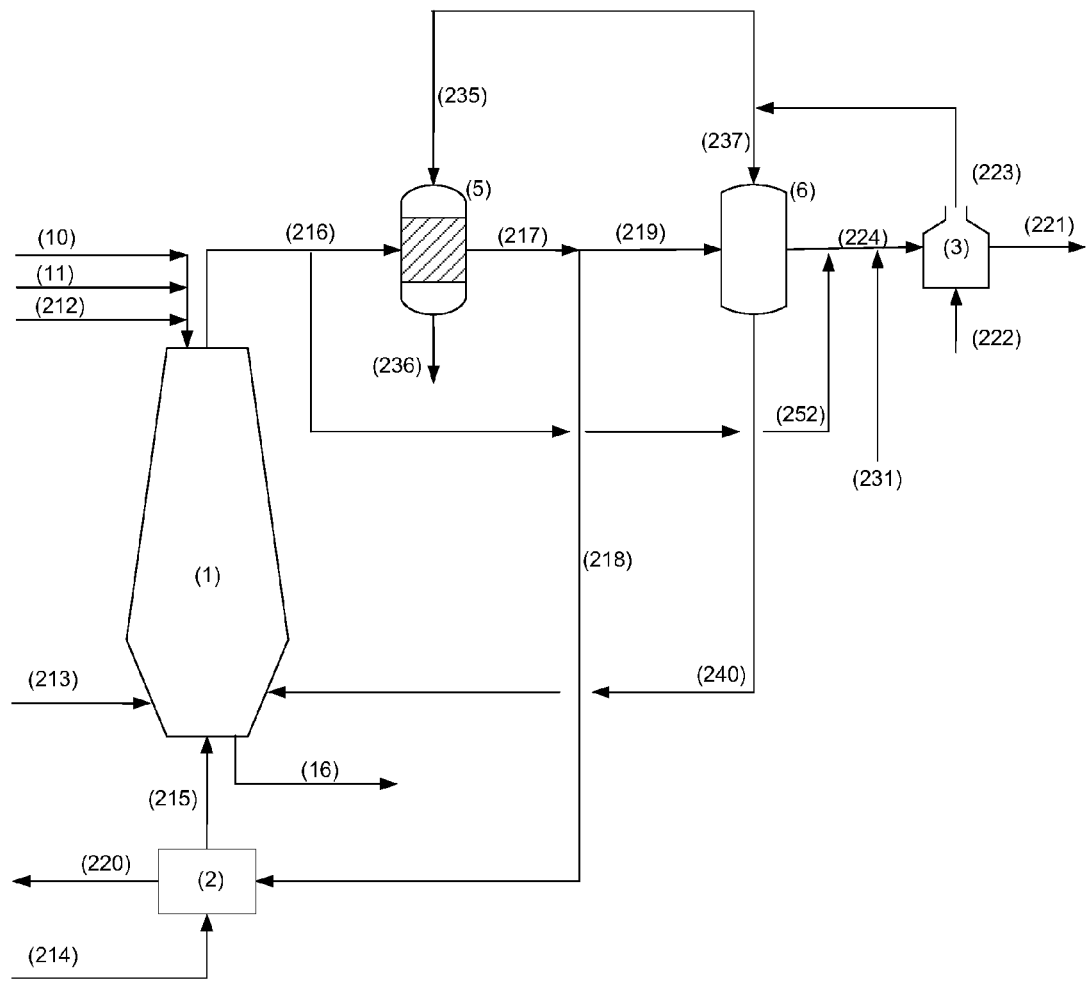
FIG. 5 is a schematic diagram of another embodiment of the present invention.

It is possible that only partial $CO_2$ reduction will be required or desired, at least initially. In this case, as shown in FIG. 5, a portion of stream (216) is drawn off as bypass stream (252) which bypasses both the hydrogen generation system (6) and the $CO_2$ removal system (5). In this case, less $CO_2$ will be removed than in the process shown in FIG. 1 and less hydrogen (240) will be produced. Smaller systems have the advantage of reducing the capital cost.

In the process shown in FIG. 3, the gas (325) coming out of the second $CO_2$ removal system (7) is primarily nitrogen, so it would require a relatively large second hydrogen generation system to produce more hydrogen. However, this gas does have sufficient reduction potential that it could be used as a reducing gas for a hydrogen generation system, although it is likely that the capital cost of the system would outweigh the benefits. This is particularly true when the blast furnace (1) cannot accept the additional hydrogen.

The present invention provides many advantages, including the following:

The pressure of the hydrogen obtained from system (6) is a function of the pressure of the steam fed to system (6), so no separate step of hydrogen compression is required as long as the steam pressure is high enough to inject the hydrogen into the blast furnace. This saves on costs of capital and operation, and it provides operational ease and flexibility.

Hydrogen fed to the reduction of the base metal reduces the amount of coke required. Because coke is an expensive fuel, replacing it with coal provides an economic advantage. Hydrogen has the added advantage that its reduction kinetics and mass transfer are fast, so it is very efficient and effective at reducing iron ore and other base metal oxides.

The present invention separates $CO_2$ from furnace offgas while also reducing the amount of coke required for the furnace. Thus, the invention takes advantage of the chemical value of $CO_2$-depleted offgas to produce hydrogen without requiring further purification or compression of that gas.

The present invention reduces $CO_2$ emissions from the furnace to the atmosphere. Not all of the furnace offgas needs to be processed. No significant modification to the furnace or stoves is required. The process can be tailored to meet a wide range of requirements of permissible $CO_2$ emissions.

The present invention separates $CO_2$ from furnace offgas at a lower cost than other processes. The cost of using this invention is lower because the cost of fuel for the furnace is reduced.

Example 1

This example provides more details about the processes shown above and their relative advantages. Case 1 is based on use of an existing blast furnace with no $CO_2$ removal system (5) and no hydrogen production system (6), and with feeding a portion of the furnace offgas to the stoves (2). Case 2 is based on the blast furnace of Case 1 to which a $CO_2$ removal system has been added. Case 3 is based on the overall system shown in FIG. 1, including a $CO_2$ removal system (5) and a hydrogen generation system (6). Case 4 is based on the overall system shown in FIG. 2, with $CO_2$ removal systems both before and after the hydrogen production system.

|  |  | Case 1 | | Case 2 | | Case 3 | | Case 4 | |
| --- | --- | --- | --- | --- | --- | --- | --- | --- | --- |
| Parameter | Units | Stream | Value | Stream | Value | Stream | Value | Stream | Value |
| Iron Ore | TPD | 11 | 9602 | 11 | 9602 | 11 | 9602 | 11 | 9602 |
| Coke | TPD | 12 | 2317 | 12 | 2317 | 212 | 1722 | 212 | 1722 |
| Coal | TPD | 13 | 838 | 13 | 838 | 213 | 1067 | 213 | 1067 |

-continued

|  |  | Case 1 | | Case 2 | | Case 3 | | Case 4 | |
|---|---|---|---|---|---|---|---|---|---|
| Parameter | Units | Stream | Value | Stream | Value | Stream | Value | Stream | Value |
| Air | TPD | 14 | 8196 | 14 | 8196 | 214 | 7946 | 214 | 7946 |
| Oxygen | TPD | 14 | 581 | 14 | 581 | 214 | 506 | 214 | 506 |
| Hot Metal | TPD | 16 | 6000 | 16 | 6000 | 16 | 6000 | 16 | 6000 |
| Hydrogen | MMSCFD | n/a | n/a | n/a | n/a | 240 | 60 | 240 | 60 |
| Hydrogen | MMSCFD | n/a | n/a | n/a | n/a | 239 | 3 | 239 | 3 |
| $CO_2$ Balance | | | | | | | | | |
| Emitted | TPD | | 8716 | | 5322 | | 4748 | | 2903 |
| Avoided | TPD | | 0 | | 3394 | | 3968 | | 5813 |
| Captured | TPD | | 0 | | 3388 | | 2514 | | 4645 |
| % Reduced Emissions | | | — | | 39 | | 46 | | 67 |

TPD = tons per day
MMSCFD = millions of standard cubic feet per day

Case 1 emits 8716 TPD of $CO_2$ while producing 6000 TPD of hot metal from 9602 TPD of iron ore. The blast furnace requires 838 TPD of coal, 2317 TPD of coke, and 581 TPD of oxygen to reduce the iron ore.

Case 2 with no changes to the blast furnace operation but the addition of a $CO_2$ removal system for the blast furnace gas, removes 3394 TPD of $CO_2$ and requires 46.3 MW of power and significant capital cost. This represents a 39% reduction in $CO_2$ emissions. However, the only benefit provided is reduced $CO_2$ emissions.

Case 3 adds the hydrogen production system to Case 2 and feeds hydrogen from that system to the furnace. The hydrogen production system produces 63 MMSCFD of hydrogen, of which 60 MMSCFD can be injected into the blast furnace with the remainder used in the boiler. The hydrogen injected into the blast furnace improves the blast furnace performance by providing an effective reducing agent. This reduces the coke feed from 2317 TPD to 1722 TPD and the oxygen feed from 581 TPD to 506 TPD. It also allows the coal feed to increase from 838 TPD to 1067 TPD. This change is desirable because coke is more expensive than coal. The hydrogen production system also reduces $CO_2$ emissions to 4748 TPD from 5322 TPD because less carbon-containing fuel is used. This process reduces $CO_2$ emissions by 46% compared to Case 1. Furthermore, there are economic benefits by reducing the operating cost because less coke is consumed. Case 3 does require more power than Case 2, but the cost of the additional power is unlikely to be more than the cost saved by reducing coke consumption.

Case 4 adds another $CO_2$ removal system to the system of Case 3. This additional system removes an additional 1845 TPD of $CO_2$, but provides little additional benefit to the iron making process. This represents a 67% reduction in $CO_2$ emissions compared to Case 1. The capital cost of the $CO_2$ removal system is significant, so this process would be selected only if the cost or tax for emitting $CO_2$ is relatively high.

Example 2

This example provides more information about the hydrogen generation process as shown in Cases 3 and 4 of Example 1. Referring to FIG. 2, the inlet reducing gas (219) has a flow rate of 11.2 million SCFH and contains 22.5% CO and 13.5% $H_2$ with the remainder being $H_2O$, $CO_2$, and $N_2$. Stream (219) is heated in heat exchangers (402) and (408) so that the reactor (404A) inlet temperature is 750° C. The reactor outlet stream (422) contains 7.2% CO and 5.6% $H_2$ because most of the reducing gas was oxidized to reduce the iron oxide particles in the reactor.

After reducing the bed, the next step in the cycle begins by switching valves (401) and (405). 4.48 million SCFH of steam (237) is fed to reactor (404B) in FIG. 2, but reactor (404A) in the cycle. The steam (412A) is heated to 650° C. in heater (409). Steam (412B) is used to oxidize the reduced bed in the reactor to make hydrogen. In this case, 58.3% of the steam reacts with the bed to produce 2.61 million SCFH of hydrogen. The steam/hydrogen mixture (413) is cooled and separated in separator (407) to produce 2.61 million SCFH of hydrogen product (238).

The hydrogen fed to the blast furnace is capped at 60 MMSCFD in the example. This is based on the assumption that the blast furnace can take only 1 MMSCF per 100 tons of hot metal produced. If the other 3 MMSCFD of hydrogen can be processed by the blast furnace, it could provide additional coke savings beyond what is shown in the example.

What is claimed is:

1. Apparatus useful for producing metal comprising
   (A) a blast furnace for producing fully reduced base metal and offgas comprising carbon monoxide and carbon dioxide from carbonaceous matter and an oxide of said base metal;
   (B) a carbon dioxide removal system, coupled to said blast furnace to receive at least a portion of said offgas from said blast furnace, for removing carbon dioxide from said offgas and producing carbon dioxide-depleted offgas; and
   (C) a hydrogen production system, coupled to said carbon dioxide removal system to receive at least a portion of said carbon dioxide-depleted offgas from said carbon dioxide removal system, for producing hydrogen by contacting carbon dioxide-depleted offgas with a reactor metal oxide in which the reactor metal is at a first oxidation state, to produce reactor metal or a reactor metal oxide in which the oxidation state of the reactor metal has been reduced to a second lower oxidation state by reaction of oxygen from the reactor metal oxide with carbon monoxide in the carbon dioxide-depleted offgas to produce a carbon dioxide-augmented stream, and subsequently contacting said reactor metal or reactor metal oxide at said second oxidation state with steam to produce a hydrogen-containing stream separate from said carbon dioxide-augmented stream and oxidize said reactor metal or reactor metal oxide to said first oxidation state.

2. Apparatus according to claim 1 wherein the reactor metal is selected from the group consisting of iron, copper, nickel, cobalt, lead, zinc, bismuth, manganese, chromium, vanadium, titanium, molybdenum, cerium, and combinations thereof.

3. Apparatus according to claim 1 wherein said reactor metal comprises iron.

4. Apparatus according to claim 1 wherein said reactor metal comprises layers or a mixture of different metals.

5. Apparatus according to claim 1 wherein said base metal is selected from the group consisting of iron, copper, nickel, cobalt, aluminum, zinc, lead, and combinations thereof.

6. Apparatus according to claim 1 wherein said base metal comprises iron.

7. Apparatus according to claim 1 further comprising a second carbon dioxide removal system, coupled to said hydrogen production system to receive at least a portion of said carbon dioxide-augmented stream, for removing carbon dioxide from said carbon dioxide-augmented stream.

8. Apparatus according to claim 1 wherein said carbon dioxide removal system is a pressure swing adsorption system.

9. Apparatus according to claim 1 wherein said hydrogen production system (C) comprises a first bed and a second bed each coupled to said carbon dioxide removal system and capable of alternately being fed said carbon dioxide-depleted offgas or steam.

10. Apparatus according to claim 1 where said hydrogen production system (C) comprises a first bed coupled to said carbon dioxide removal system to receive said carbon dioxide-depleted offgas, and a second bed coupled to a source of steam, wherein the first and second beds are coupled to each other to feed reduced reactor metal or reduced reactor metal oxide produced in said first bed to said second bed and feed reactor metal oxide produced in said second bed to said first bed.

11. Apparatus according to claim 1 wherein said reactor is coupled to said hydrogen production system to receive at least a portion of hydrogen produced in said hydrogen production system.

12. Apparatus according to claim 11 wherein the reactor metal is selected from the group consisting of iron, copper, nickel, cobalt, lead, zinc, bismuth, manganese, chromium, vanadium, titanium, molybdenum, cerium, and combinations thereof.

13. Apparatus according to claim 11 wherein said reactor metal comprises iron.

14. Apparatus according to claim 11 wherein said reactor metal comprises layers of different metals.

15. Apparatus according to claim 11 wherein said base metal is selected from the group consisting of iron, copper, nickel, cobalt, aluminum, zinc, lead, and combinations thereof.

16. Apparatus according to claim 11 wherein said base metal comprises iron.

17. Apparatus according to claim 11 further comprising a second carbon dioxide removal system, coupled to said hydrogen production system to receive at least a portion of said carbon dioxide-augmented stream, for removing carbon dioxide from said carbon dioxide-augmented stream.

18. Apparatus according to claim 11 wherein said carbon dioxide removal system is a pressure swing adsorption system.

19. Apparatus according to claim 11 wherein said hydrogen production system (C) comprises a first bed and a second bed each coupled to said carbon dioxide removal system and capable of alternately being fed said carbon dioxide-depleted offgas or steam.

20. Apparatus according to claim 11 wherein said hydrogen production system (C) comprises a first bed coupled to said carbon dioxide removal system to receive said carbon dioxide-depleted offgas, and a second bed coupled to a source of steam, wherein the first and second beds are coupled to each other to feed reduced reactor metal or reduced reactor metal oxide produced in said first bed to said second bed and feed reactor metal oxide produced in said second bed to said first bed.

21. Apparatus useful for producing metal comprising
 (A) a reactor for producing fully reduced base metal and offgas comprising carbon monoxide and carbon dioxide from carbonaceous matter and an oxide of said base metal;
 (B) a carbon dioxide removal system, coupled to said reactor to receive at least a portion of said offgas from said reactor, for removing carbon dioxide from said offgas and producing carbon dioxide-depleted offgas; and
 (C) a hydrogen production system, coupled to said carbon dioxide removal system to receive at least a portion of said carbon dioxide-depleted offgas from said carbon dioxide removal system, for producing hydrogen by contacting carbon dioxide-depleted offgas with a reactor metal oxide in which the reactor metal is at a first oxidation state, to produce reactor metal or a reactor metal oxide in which the oxidation state of the reactor metal has been reduced to a second lower oxidation state by reaction of oxygen from the reactor metal oxide with carbon monoxide in the carbon dioxide-depleted offgas to produce a carbon dioxide-augmented stream, and subsequently contacting said reactor metal or reactor metal oxide at said second oxidation state with steam to produce a hydrogen-containing stream separate from said carbon dioxide-augmented stream and oxidize said reactor metal or reactor metal oxide to said first oxidation state,
wherein said hydrogen production system (C) comprises a first bed coupled to said carbon dioxide removal system to receive said carbon dioxide-depleted offgas, and a second bed coupled to a source of steam, wherein the first and second beds are coupled to each other to feed reduced reactor metal or reduced reactor metal oxide produced in said first bed to said second bed and feed reactor metal oxide produced in said second bed to said first bed.

22. Apparatus according to claim 21 wherein the reactor metal is selected from the group consisting of iron, copper, nickel, cobalt, lead, zinc, bismuth, manganese, chromium, vanadium, titanium, molybdenum, cerium, and combinations thereof.

23. Apparatus according to claim 21 wherein said reactor metal comprises iron.

24. Apparatus according to claim 21 wherein said reactor metal comprises layers or a mixture of different metals.

25. Apparatus according to claim 21 wherein said base metal is selected from the group consisting of iron, copper, nickel, cobalt, aluminum, zinc, lead, and combinations thereof.

26. Apparatus according to claim 21 wherein said base metal comprises iron.

27. Apparatus according to claim 21 further comprising a second carbon dioxide removal system, coupled to said hydrogen production system to receive at least a portion of said carbon dioxide-augmented stream, for removing carbon dioxide from said carbon dioxide-augmented stream.

28. Apparatus according to claim 21 wherein said carbon dioxide removal system is a pressure swing adsorption system.

29. Apparatus according to claim 21 wherein said hydrogen production system (C) comprises a first bed and a second bed each coupled to said carbon dioxide removal system and capable of alternately being fed said carbon dioxide-depleted offgas or steam.

30. Apparatus according to claim 21 wherein said reactor is coupled to said hydrogen production system to receive at least a portion of hydrogen produced in said hydrogen production system.

31. Apparatus according to claim 30 wherein the reactor metal is selected from the group consisting of iron, copper, nickel, cobalt, lead, zinc, bismuth, manganese, chromium, vanadium, titanium, molybdenum, cerium, and combinations thereof.

32. Apparatus according to claim 30 wherein said reactor metal comprises iron.

33. Apparatus according to claim 30 wherein said reactor metal comprises layers of different metals.

34. Apparatus according to claim 30 wherein said base metal is selected from the group consisting of iron, copper, nickel, cobalt, aluminum, zinc, lead, and combinations thereof.

35. Apparatus according to claim 30 wherein said base metal comprises iron.

36. Apparatus according to claim 30 further comprising a second carbon dioxide removal system, coupled to said hydrogen production system to receive at least a portion of said carbon dioxide-augmented stream, for removing carbon dioxide from said carbon dioxide-augmented stream.

37. Apparatus according to claim 30 wherein said carbon dioxide removal system is a pressure swing adsorption system.

38. Apparatus according to claim 30 wherein said hydrogen production system (C) comprises a first bed and a second bed each coupled to said carbon dioxide removal system and capable of alternately being fed said carbon dioxide-depleted offgas or steam.

* * * * *